United States Patent
Ichihara et al.

(10) Patent No.: US 7,226,066 B2
(45) Date of Patent: Jun. 5, 2007

(54) REAR ARM FOR MOTORCYCLE

(75) Inventors: Hisashi Ichihara, Shizuoka-ken (JP); Yasunobu Kanou, Shizuoka-ken (JP); Tatsumi Takahata, Shizuoka-ken (JP)

(73) Assignee: Yamaha Hatsudoki Kabushiki Kaisha, Shizuoka-Ken (JP)

( * ) Notice: Subject to any disclaimer, the term of this patent is extended or adjusted under 35 U.S.C. 154(b) by 211 days.

(21) Appl. No.: 10/509,544

(22) PCT Filed: Sep. 16, 2003

(86) PCT No.: PCT/JP03/11792

§ 371 (c)(1),
(2), (4) Date: Sep. 27, 2004

(87) PCT Pub. No.: WO2004/024548

PCT Pub. Date: Mar. 25, 2004

(65) Prior Publication Data

US 2005/0206122 A1    Sep. 22, 2005

(30) Foreign Application Priority Data

Sep. 13, 2002 (JP) .............................. 2002-268225

(51) Int. Cl.
*B62K 25/10* (2006.01)
(52) U.S. Cl. ...................................... 280/284; 180/227
(58) Field of Classification Search ................ 180/219, 180/227; 280/284
See application file for complete search history.

(56) References Cited

U.S. PATENT DOCUMENTS

| | | | | |
|---|---|---|---|---|
| 4,813,697 A | * | 3/1989 | Takada | 280/284 |
| 5,531,289 A | * | 7/1996 | Muramatsu | 180/227 |
| 6,315,071 B1 | * | 11/2001 | Gogo | 180/219 |
| 6,789,638 B2 | * | 9/2004 | Miyashiro | 180/227 |

FOREIGN PATENT DOCUMENTS

| | | |
|---|---|---|
| EP | 0 417 727 | 9/1990 |
| JP | 59-29581 | 2/1984 |
| JP | 02-193791 | 7/1990 |
| JP | 03-136993 | 6/1991 |
| JP | 03-220079 | 9/1991 |
| JP | 2002-225775 | 8/2002 |

* cited by examiner

*Primary Examiner*—Tony H. Winner
(74) *Attorney, Agent, or Firm*—Hogan & Hartson LLP

(57) ABSTRACT

A rear arm 15 for a motorcycle obtained by weld-bonding left and right arm molded bodies 2 and 3 made of aluminum alloy die-cast, which are formed by dividing pivot sections 2b and 3b and cross member sections 2c and 3c into left and right parts along a body central line, in the pivot sections and the cross member sections is provided, in which left and the right arm sections 2a and 3a are formed in substantially a triangular shape in side view and formed in substantially C shape opening toward an inner side in a width direction of the vehicle in cross-sectional view, and the cross member sections 2c and 3c are formed in a closed sectional shape extending from vertexes 2g and 3g of the triangular shapes to bases thereof.

17 Claims, 10 Drawing Sheets

REAR ARM FOR MOTORCYCLE

BACKGROUND OF THE INVENTION

1. Technical Field

The present invention relates to a rear arm for a motorcycle for supporting a rear wheel so as to swing in the vertical direction freely with respect to a body frame, and in particular, to a rear arm that makes it possible to realize the reduction in weight and the reduction in manufacturing cost while securing high rigidity.

2. Background Art

As a rear arm for a motorcycle, conventionally, for example, there is one obtained by bringing divided surfaces of left and right member sections, which are divided in the middle of a cross member, of a cast-molded body made of light alloy, in which the left and right member sections are formed integrally with left and right arm sections, respectively, into abutment against each other.

Incidentally, in a motorcycle, it is important to make the rear arm light in weight and rigid from the viewpoint of improving driving stability, and the conventional rear arm manufactured by weld-bonding a molded body made of light alloy can meet such a demand to some extent.

However, recently, a rear arm, which is lighter in weight and more rigid and makes it possible to further realize reduction in manufacturing cost, has been demanded. It is an advantage of the invention to provide a rear arm for a motorcycle that can meet such a recent demand.

SUMMARY OF THE INVENTION

A rear arm for a motorcycle includes left and right arm portions, pivot sections of a closed sectional shape that bond front ends of the left and the right arm sections to each other, and cross member sections of a closed sectional shape that bond sections between the pivot sections and rear wheel front edges of the left and the right arm sections to each other. The pivot sections are pivotally supported by a body frame so as to swing freely in the vertical direction. The rear wheel are axially supported between rear ends of the left and the right arm sections. The rear arm consists of left and right arm molded bodies made of aluminum alloy die-cast, which are formed by dividing the pivot sections and the cross member sections into left and right parts along a body central line, and obtained by weld-bonding the left and the right arm molded bodies in the pivot sections and the cross member sections. The left and the right arm sections are formed in substantially a triangular shape viewed from sides of the motorcycle and formed in substantially a C shape opening toward the inner side in a width direction of the motorcycle viewed from the rear of the motorcycle in cross section, and the cross member sections are formed in a vertically long closed sectional shape and have rear vertical walls of an arc shape extending alone a front edge of the rear wheel viewed from sides of the motorcycle.

The cross member sections have rear vertical walls of an arc shape extending along the front edge of the rear wheel viewed from the sides of the motorcycle and front vertical walls that are formed such that lengthwise spaces between the front vertical walls and the rear vertical walls are minimized in intermediate parts in the vertical direction and are widened toward upper or lower parts thereof.

One of the left and the right cross member sections is fit and inserted into the other of the left and the right cross member sections, and the fit and inserted part is welded.

A support boss section, to which a link member of a rear wheel suspension system is coupled, is integrally formed on bottom surfaces of the cross member sections, and the support boss section is constituted by bringing integrally formed left and right boss sections into abutment against opposed surfaces of the left and the right cross member sections and weld-bonding the left and the right boss sections to each other.

The left and the right arm sections have main arm sections, which constitute the bases of the triangles formed by providing openings at the rear of the cross member sections, and reinforcing arm sections, which constitute the hypotenuses of the triangle Reinforcing plates are bonded to the left and the right arm sections at least in parts at the rear of the cross member sections of the main arm sections so as to close the openings of a C shape in cross section.

Plural reinforcing ribs crossing one another are integrally formed on sidewalls of a C shape of the left and the right arm sections. Dampers consisting of an elastic member are locked in crossing parts of the reinforcing ribs, so as to cover the reinforcing ribs. The dampers are nipped in a compressed state by the reinforcing plates and the reinforcing ribs.

The left and the right arm molded bodies are cast by using die-cast molds having plural molten metal inlets, which are arranged along the bases or the hypotenuses of the triangles of the left and the right arm sections, and molten metal outlets, which are arranged so as to correspond to the molten metal inlets, and supplying molten metal in a direction traversing the triangles.

Edges of the openings of a C shape in cross section is set thicker than the other part. The molten metal inlets are formed at edges of the openings of the main arm sections constituting the bases, and the molten metal outlets are formed at edges of the openings of the reinforcing arm sections constituting the hypotenuses.

DETAILED DESCRIPTION OF THE INVENTION

Figure 1:
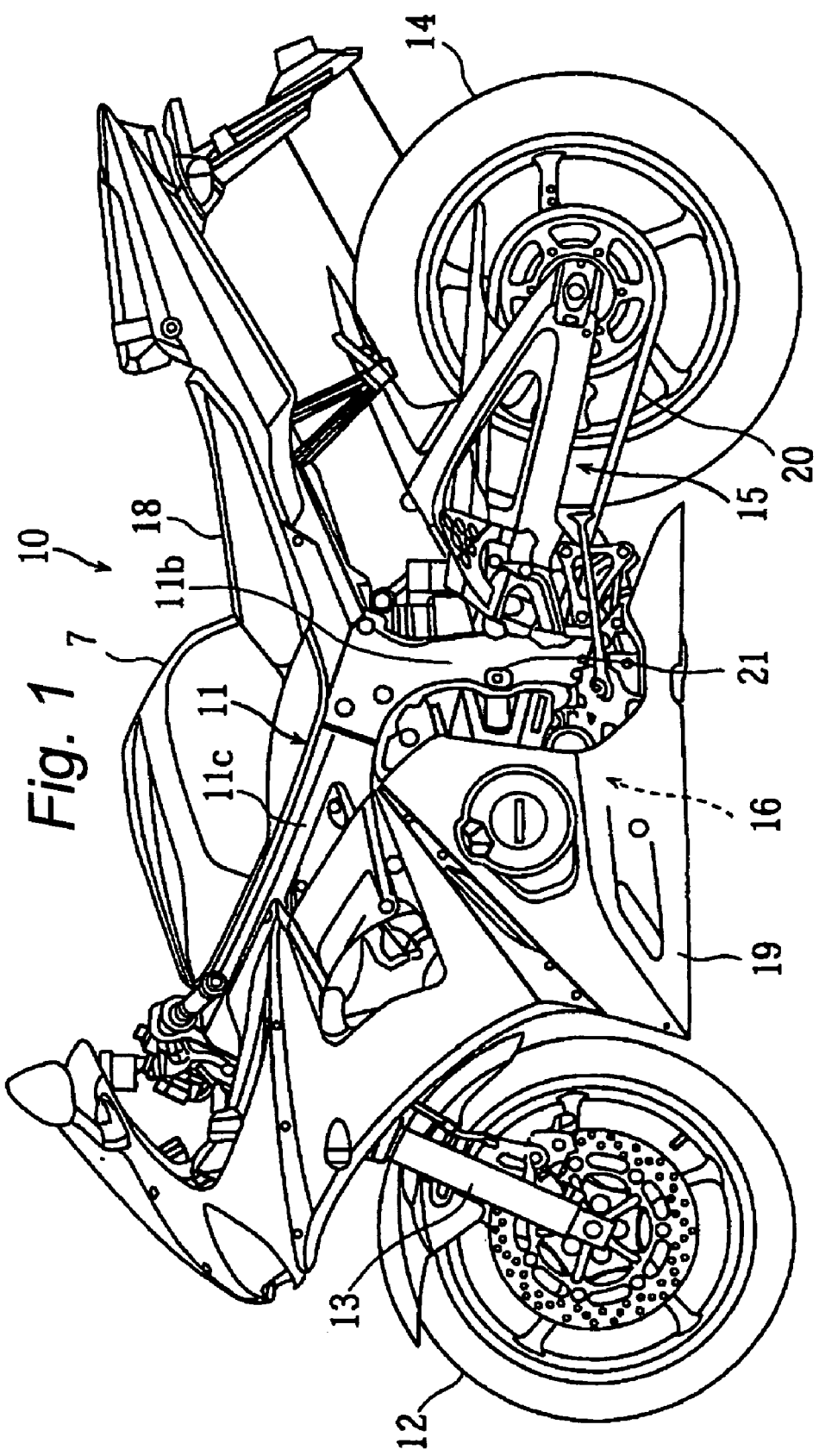
FIG. 1 is a left side view of a motorcycle provided with a rear arm according to an embodiment of the invention.
Figure 2:
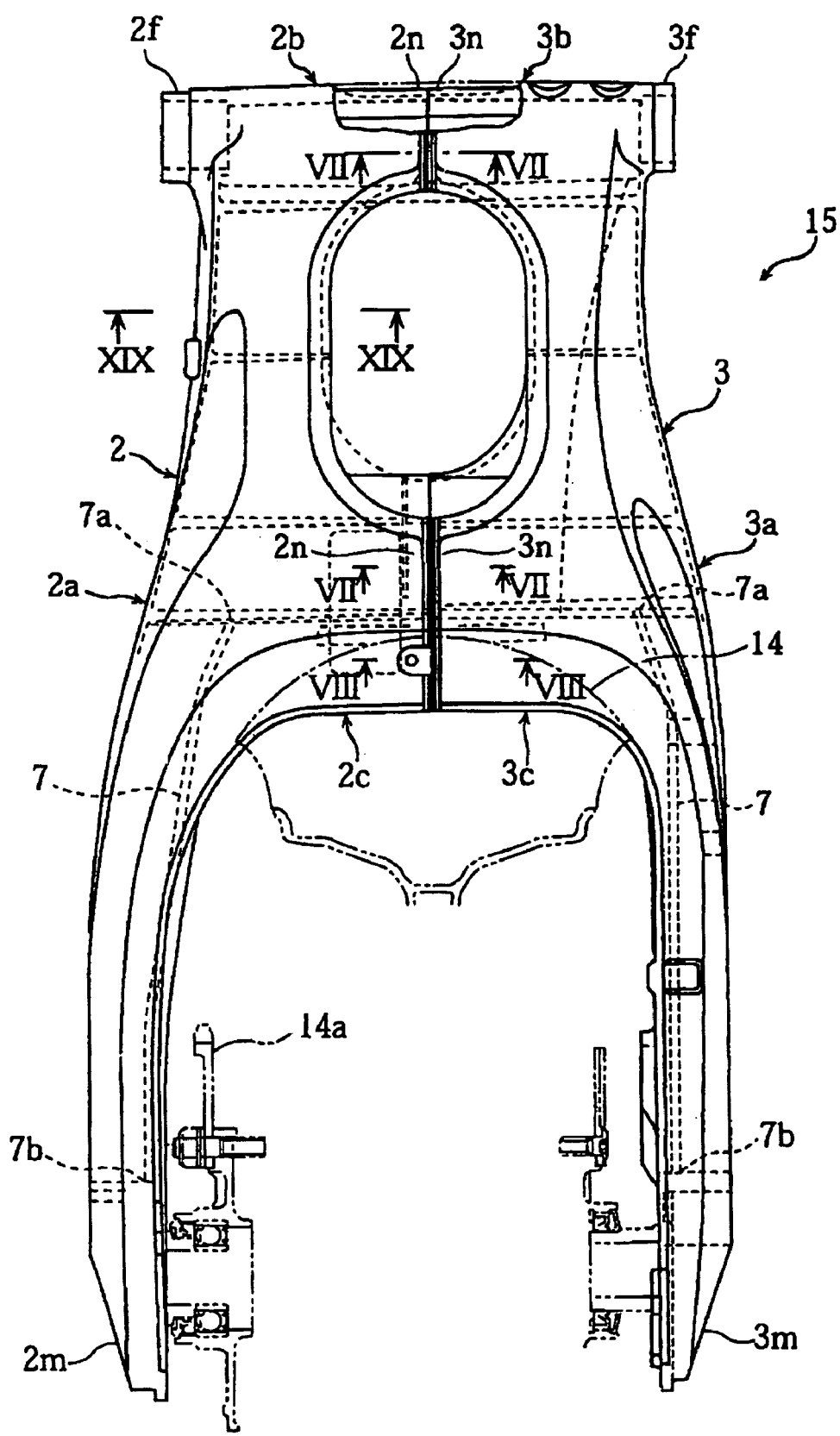
FIG. 2 is a plan view of the rear arm.
Figure 3:
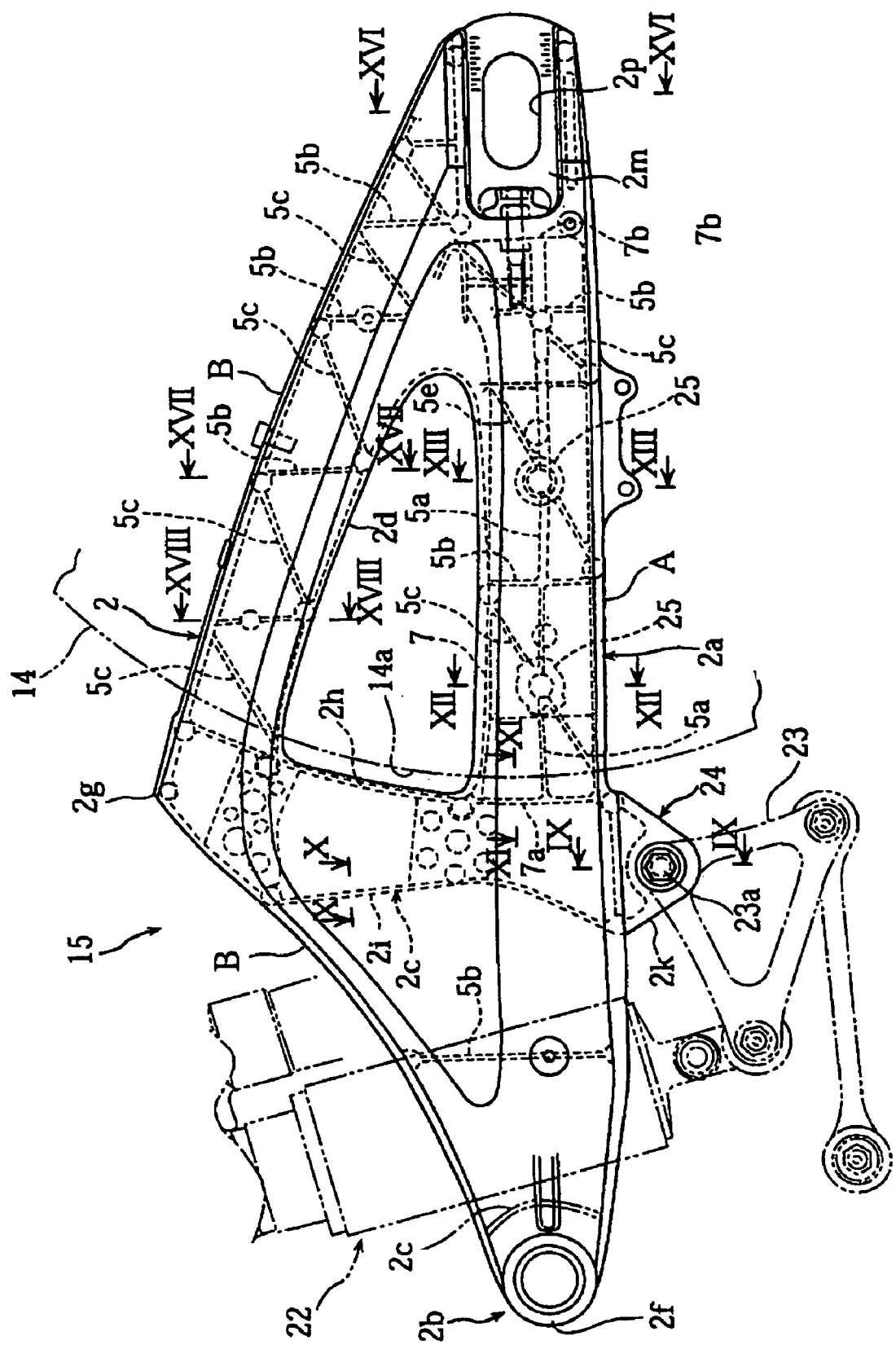
FIG. 3 is a left side view of a left arm section of the rear arm.

An embodiment of the invention will be hereinafter explained based on the attached drawings.

FIGS. 1 to 20 are diagrams for explaining a rear arm for a motorcycle in accordance with an embodiment of the invention.

In each figure, reference numeral 10 denotes a motorcycle provided with a rear arm 15 of this embodiment. This motorcycle 10 has a schematic structure in which a front fork 13 axially supporting a front wheel 12 at a lower end of the motorcycle 10 is supported by a head pipe at a front end of a body frame 11 so as to be steered to the left and right freely, a rear arm 15 axially supporting a rear wheel 14 at a rear end of the body frame 11 is pivotally supported by a rear arm bracket 11b in a central part of the motorcycle 10 so as to swing freely, an engine unit 16 is suspended and supported by a main frame 11c, and a fuel tank 17 is mounted above the engine unit 16, and a seat 18 is mounted behind the fuel tank 17. In addition, a part extending from the periphery of the front fork 13 of the body frame to the periphery of the engine unit 16 is covered with a body cover 19.

The rear arm 15 is formed by die-casting aluminum alloy and has a structure in which left and right arm molded bodies 2 and 3, which have a shape obtained by dividing a pivot section and a cross member section into left and right parts along a vehicle central line, are weld-bonded in the divided part.

The left and right arm molded bodies 2 and 3 are constituted by integrally forming left and right pivot sections 2b and 3b at front ends of left and right arm sections 2a and 3a, which extend in a length wise direction of the vehicle, so as to protrude inward in a width direction of the vehicle and integrally forming left and right cross member sections 2c and 3c between the pivot sections 2b and 3b and a front edge 14a of the rear wheel 14 so as to protrude inward in the width direction.

The left and the right arm sections 2a and 3a are formed in substantially a triangular shape when the left and the right arm sections 2a and 3a are viewed from either side of the vehicle and have openings 2d and 3d of substantially a triangular shape at the rear of the cross member sections 2c and 3c. Therefore, the left and the right arm sections 2a and 3a can also be considered as being formed by integrally forming parts constituting bases of the triangles and parts constituting hypotenuses of the triangles. In this embodiment, the parts constituting the bases are referred to as main arm sections A, and the parts constituting the hypotenuses are referred to as reinforcing arm sections B.

Note that an opening 2d of the left arm section 2a is an opening through which a tension side part of a driving chain 20, which couples a drive sprocket fixed to an engine output shaft and a driven sprocket 14 fixed to the rear wheel 14, is passed from a front outer side to a rear inner side.

In addition, the left and the right arm sections 2a and 3a are formed in substantially a C shape by integrally forming an upper wall 4b and a lower wall 4c at upper and lower edges of a sidewall 4a, which extends in a vertical direction, so as to extend in a lateral direction (inward in the width direction) when the left and the right arm sections 2a and 3a are viewed in a cross section, and openings of the C shape face the inner side of the vehicle.

In addition, reinforcing ribs are integrally formed on an inner surface of the sidewall 4a. The reinforcing ribs are constituted by various ribs such as lateral ribs 5a extending substantially horizontally in the lengthwise direction of the vehicle, vertical ribs 5b coupling the upper wall 4b and the lower wall 4c in the vertical direction, and oblique ribs 5c coupling the upper wall 4b and the lower wall 4c obliquely.

Parts at the inner side in the width direction other than the left and the right arm sections 2a and 3a of the left and the right pivot sections 2b and 3b are formed as cylinders of generally a rounded triangular shape when the parts are viewed in a cross section (see FIGS. 4 and 6), and ends on the inner side in the width direction of the left and the right cylinders 2e and 3e are weld-bonded to each other. More specifically, outer wall parts exposed forward and rear wall parts facing backward of the ends on the inner side of the cylinders 2e and 3e are welded in a state in which the wall parts are brought into abutment against each other, top wall parts and bottom wall parts are fit and inserted with each other, and a V groove formed along a boundary line b of the fitting part is weld-bonded (see FIG. 7).

In addition, left and right bearing boss sections 2f and 3f of a cylindrical shape are integrally formed at ends on the outer side of the left and the right pivot sections 2b and 3b, and the bearing boss sections 2f and 3f are supported by a pivot shaft 21, which is inserted through the inside thereof, via a bearing (not shown).

When the left and the right cross member sections 2c and 3c are viewed in a cross section, the left and the right cross member sections 2c and 3c are formed in closed sections of a pentagonal shape elongated in the vertical direction extending from vertexes 2g and 3g of the left and the right arm sections 2a and 3a to bottom surfaces thereof. Rear vertical walls 2h and 3h constituting rear sides of the closed sections are formed in an arc shape along a shape of the front edge 14a of the rear wheel 14. In addition, front vertical walls 2i and 3i constituting front sides of the closed sections are formed such that spaces in the lengthwise direction between the front vertical walls 2i and 3i and the rear vertical walls 2h and 3h are narrowest in the middle of the vertical direction, more specifically, in the vicinity of top surfaces of the main arm sections A and are widened toward upper or lower parts thereof.

In addition, a support boss section 24, to which a link member 23 of a rear wheel suspension system 22 is coupled, is formed at an inner end located in the center in the width direct ion of the bottom walls 2j and 3j of the cross member sections 2c and 3c. This support boss section 24 is constituted by bringing left and right boss sections 2k and 3k, which are integrally formed so as to bend and extend downward in opposed surface parts of the bottom walls 2j and 3j constituting bases of the closed cross sections of the left and the right cross member sections 2c and 3c, into abutment against each other and weld-bonding the left and right boss sections 2k and 3k. The link member 23 is supported by a coupling pin 23a inserted through a support hole 24a of the support boss section 24.

Figure 10:
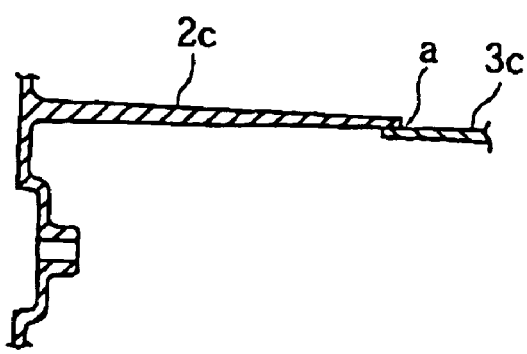
FIG. 10 is a sectional view along line X—X in FIG. 3.
Figure 11:
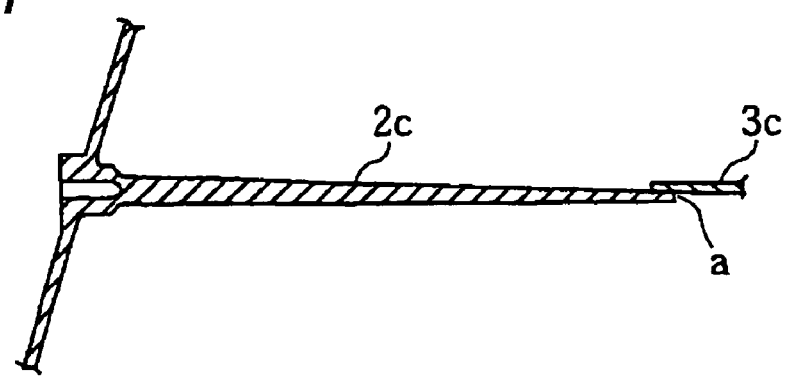
FIG. 11 is a sectional view along line XI—XI in FIG. 3.
Figure 12:
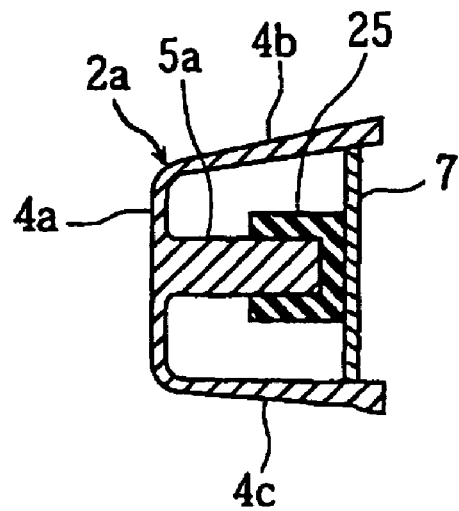
FIG. 12 is a sectional view along line XII—XII in FIG. 3.
Figure 13:
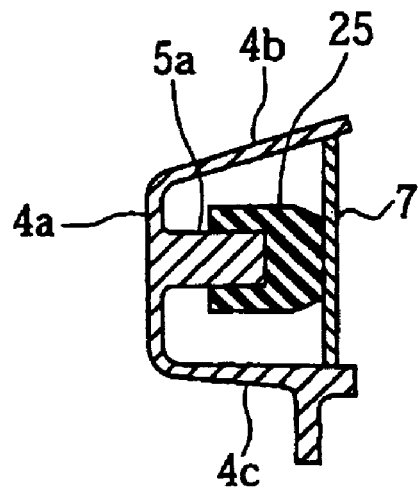
FIG. 13 is a sectional view along line XIII—XIII in FIG. 3.
Figure 14:
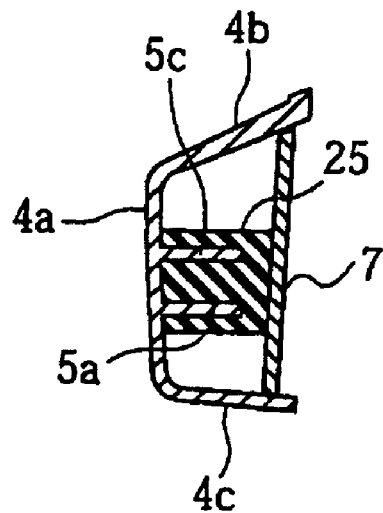
FIG. 14 is a sectional view along line XIV—XIV in FIG. 5.
Figure 15:
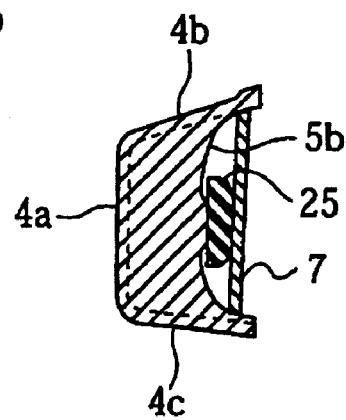
FIG. 15 is a sectional view along line XV—XV in FIG. 5.
Figure 16:
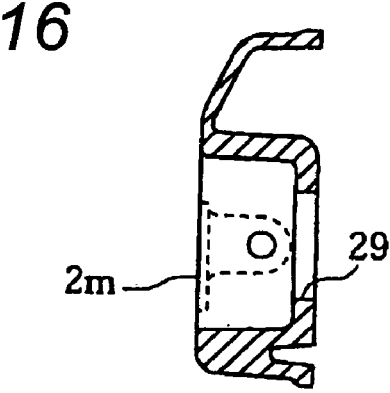
FIG. 16 is a sectional view along line XVI—XVI in FIG. 3.
Figure 17:
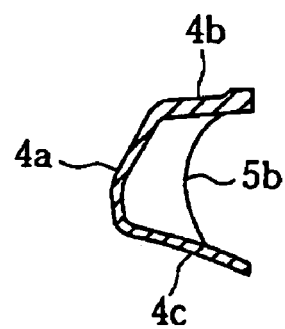
FIG. 17 is a sectional view along line XVII—XVII in FIG. 3.
Figure 18:
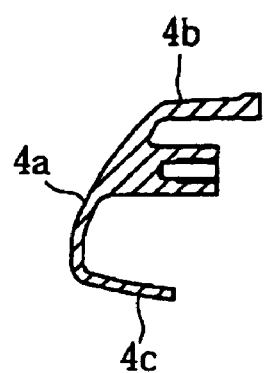
FIG. 18 is a sectional view along line XVIII—XVIII in FIG. 3.

The left and the right cross member sections 2c and 3c are bonded by fitting and inserting one of the inner ends thereof into the other and welding the inserted part. More specifically, as shown in FIGS. 10 and 11, the rear vertical walls 2h and 3h and the front vertical walls 2i and 3i of the left and the right cross member sections 2c and 3c are formed to be tapered. The right cross member section 3c is fit and inserted into the left cross member section 2c and welded along an outer peripheral boundary line a of the fit and inserted part.

In this way, since the left and the right cross member sections 2c and 3c are formed to be tapered and fit with each other, a mold of a slide type is not required, and the fitting structure can be realized without causing complication of a mold structure.

Figure 7:
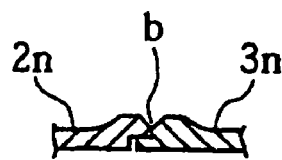
FIG. 7 is a sectional view along line VII—VII in FIG. 3.
Figure 8:
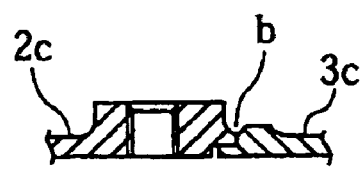
FIG. 8 is a sectional view along line VIII—VIII in FIG. 3.
Figure 9:
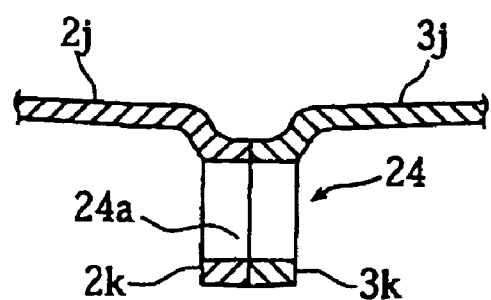
FIG. 9 is a sectional view along line IX—IX in FIG. 3.

In addition, as shown in FIGS. 7 and 8, top wall parts and bottom wall parts exposed to the outside excluding the rear vertical walls and the front vertical walls of the left and the right cross member sections 2c and 3c form a V groove along an outer peripheral boundary line b of a fit and inserted part formed in a rectangular medicine case shape in opposed ends 2n and 3n of the left and the right cross member sections 2c and 3c, and the V groove section is welded.

Since the fit part is exposed to the outside, in a mold structure, a mold is parted in the vertical direction in FIGS. 7 and 8, and the fitting structure can be realized without causing complication of the mold structure.

In addition, in parts at the rear of the cross member sections 2c and 3c of the main arm sections A constituting the bases of the triangles of the left and the right arm sections 2a and 3a, tuning plates (reinforcing plates) 7 are arranged so as to close the openings on the inner side of the C shape and are welded and fixed. Front ends 7a of the tuning plates 7 reach rear vertical walls 2h and 3h of the cross member sections, and rear ends 7b of the turning plates 7 reach front edges of axle support sections 2m and 3m formed at rear ends of the main arm sections A. Note that reference signs 2p and 3p denote axle through-holes.

Figure 19:
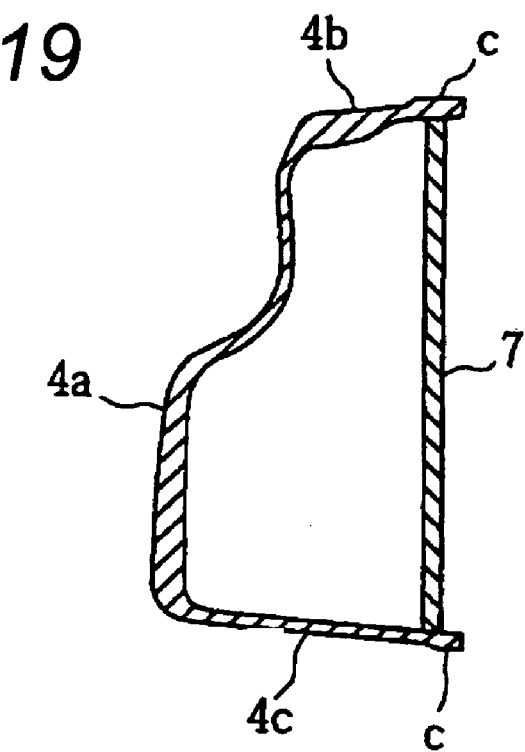
FIG. 19 is a sectional view along line XIX—XIX in FIG. 2.

Here, the tuning plates 7 function as plates for operability adjustment for finding operation stability or the like according to an application of the vehicle by appropriately changing locations and areas where the tuning plates 7 are disposed, thickness of the tuning plates 7, and the like. A range of application thereof is not limited to this embodiment. For example, in this embodiment, the tuning plates 7 are provided only in rear parts of the left and the right main arm sections A. However, as shown in FIG. 19, the tuning plates 7 can be provided on front sides of the cross member sections 2c and 3c independently or additionally. Moreover, the tuning plates can also be provided in parts at the rear of the cross member sections of the reinforcing arm sections B.

In addition, dampers for vibration proof 25 consisting of an elastic member are disposed in a compressed state between the tuning plates 7 and the reinforcing ribs 5a to 5c. The dampers 25 are locked in crossing parts of the lateral ribs 5a and the vertical ribs 5b or the oblique ribs 5c, whereby the dampers 25 are prevented from moving due to vibrations or the like.

Here, a method of manufacturing the left and the right arm molded bodies 2 and 3 in this embodiment will be explained. The left and the right arm molded bodies 2 and 3 are cast by using die-cast molds 26 having plural molten metal inlets 26a, which are arranged along the main arm sections A constituting the bases of the triangles of the left and the right arm sections 2a and 3a, and molten metal outlets 26b, which are arranged along the reinforcing arm sections B constituting the hypotenuses so as to correspond to the molten metal inlets 26a, and supplying molten metal in directions traversing the triangles.

Figure 4:
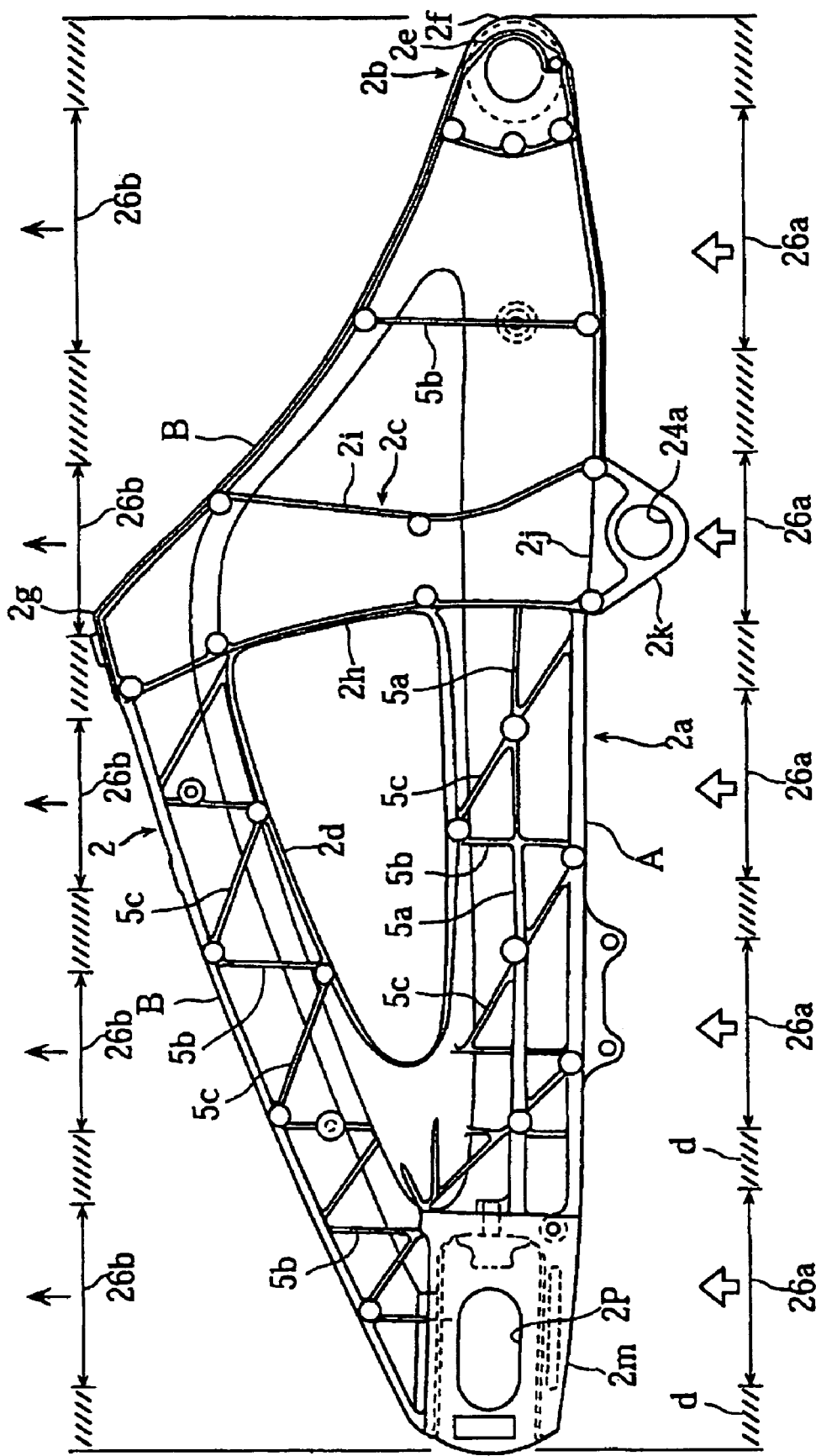
FIG. 4 is a side view viewed from the inside of the left arm section.
Figure 5:
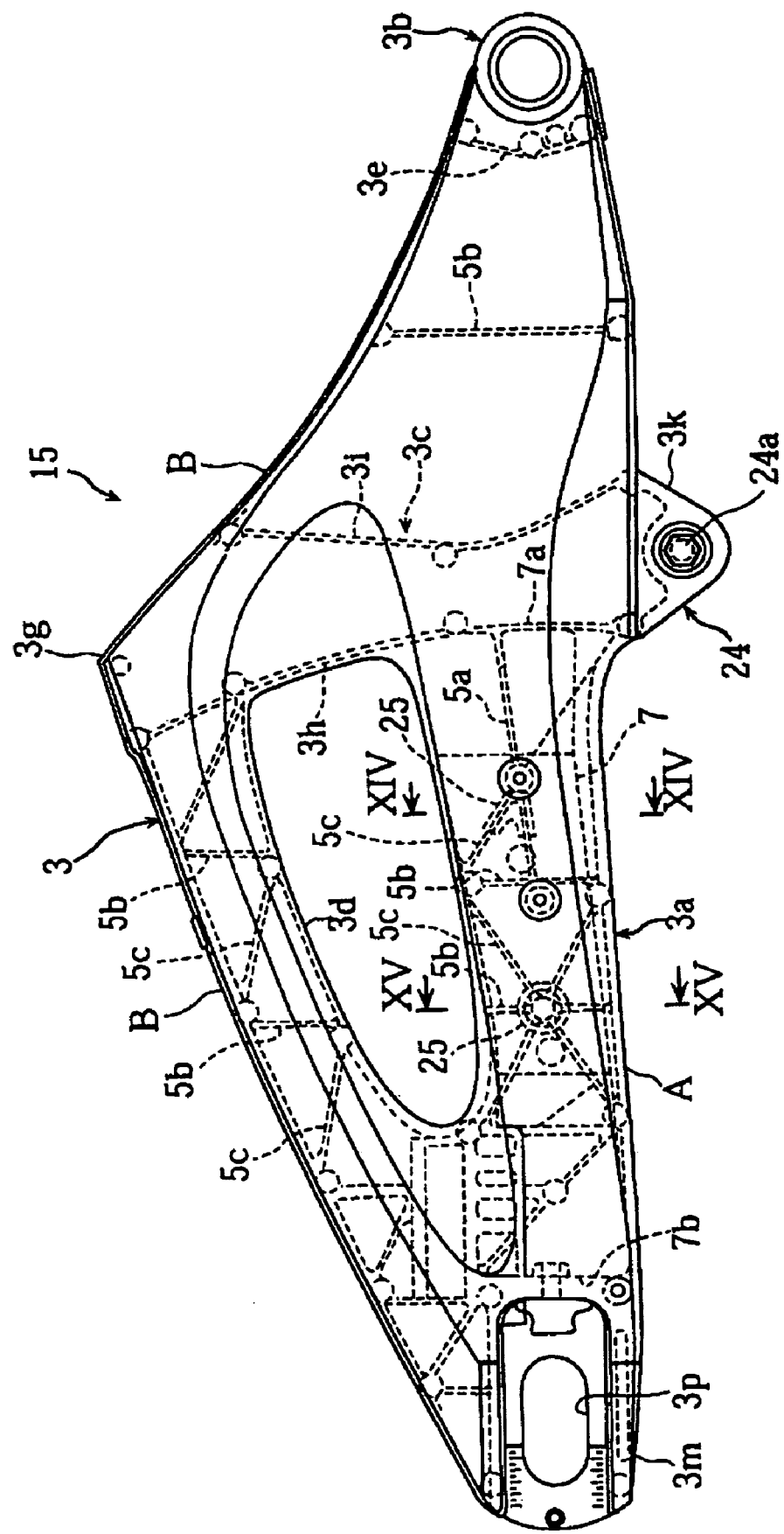
FIG. 5 is a right side view of a right arm section of the rear arm.
Figure 6:
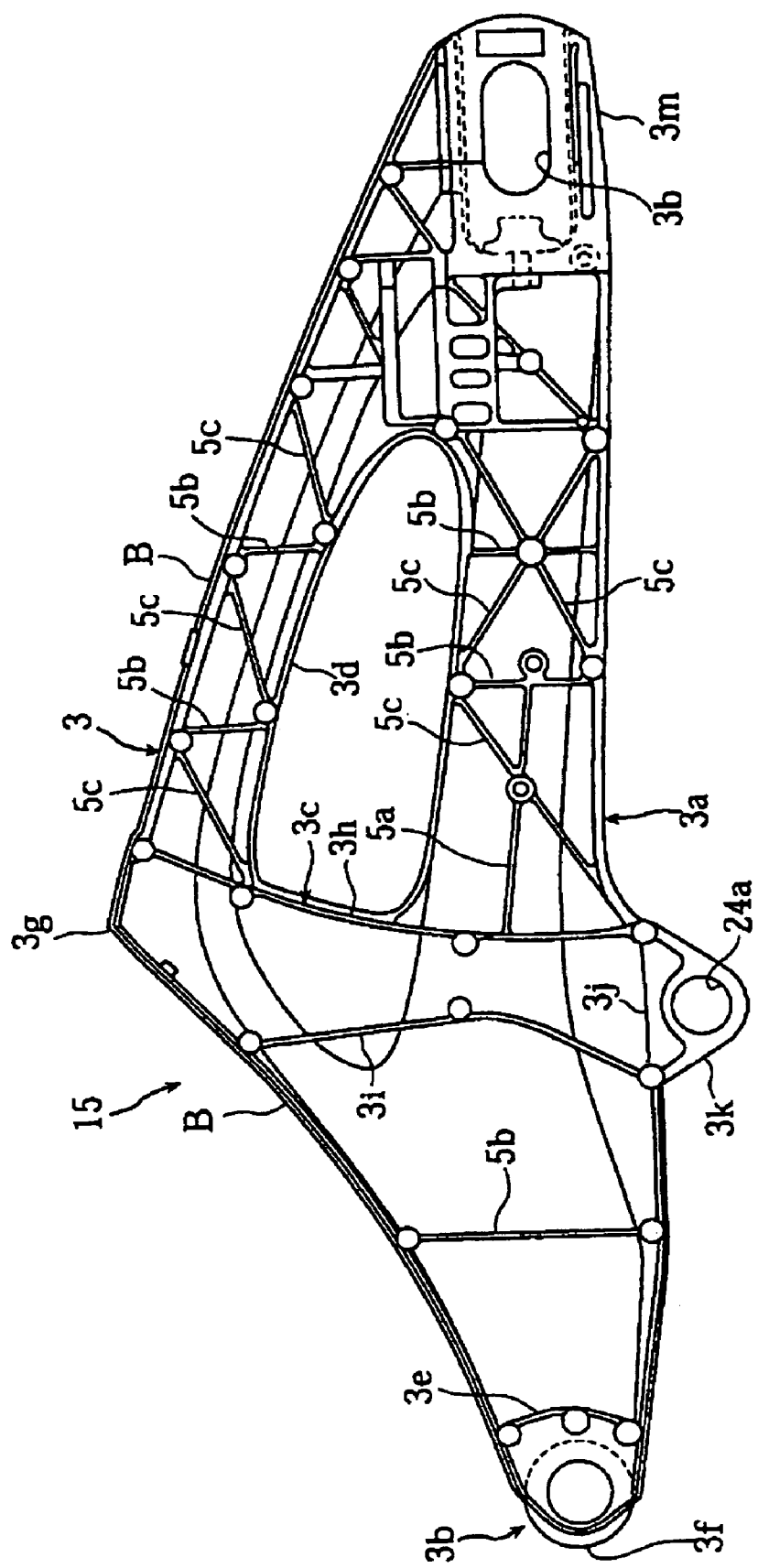
FIG. 6 is a side view viewed from the inside of the right arm section.

Here, the opening edges c of a C shape in cross section of the main arm sections and the reinforcing arm sections are generally set thicker than the other parts. In addition, although it is desirable to provide the molten metal inlets 26a and the molten metal outlets 26b over the entire length in the longitudinal direction of the respective arm sections, as schematically shown in FIG. 4, non-pouring gate parts d are provided for each predetermined pitch in a range necessary for maintaining a mold shape.

As described above, in this embodiment, the rear arm 15 is constituted by weld-bonding the left and the right arm molded bodies 2 and 3 made of aluminum alloy die-cast in both the pivot sections 2b and 3b and the cross member sections 2c and 3c. Thus, reduction in weight can be realized, and higher rigidity can be secured compared with the rear arm in which only the cross member sections are weld-bonded.

Further, the left and the right arm sections 2a and 3a are formed in substantially a triangular shape in a side view, and the cross member sections 2c and 3c are formed in a closed sectional shape extending from the vertexes 2g and 3g of the triangular shapes to bases thereof. Thus, since the arm sections of the triangular shapes are further demarcated into two triangles by the cross member sections 2c and 3c to form a truss structure, rigidity of the entire rear arm 15 increases significantly.

In addition, lengthwise spaces between the front vertical walls 2h and 3h and the rear vertical wall 2i and 3i constituting the closed sectional shape of the cross member section 2c and 3c are minimized in intermediate parts in the vertical direction, more specifically, near top surfaces of the main arm sections A, and are widened toward upper or lower parts thereof. Thus, rigidity of the entire rear arm 15 can be further increased. In other words, in the rear arm 15, although compression and tension loads act on the vertexes 2g and 3g of the triangular shapes and the bottom surfaces of the main arm sections A due to a road surface load, since the cross member sections 2c and 3c have a large lengthwise distance on an upper side and a lower side in the closed sectional shapes, the rear arm 15 can cope with the large load appropriately.

In addition, the right cross member section 3c is fit and inserted into the left cross member section 2c, and the fit and inserted part is welded. Thus, bonding intensity can be increased compared with the case in which both the parts are simply brought into abutment against each other and welded.

In this case, as shown in FIGS. 10 and 11, the rear vertical walls 2h and 3h and the front vertical walls 2i and 3i of the left and the right cross member sections 2c and 3c are formed to be tapered and the right cross member section 3c is fit and inserted into the left cross member section 2c and welded along an outer peripheral boundary line a of the fit and inserted part. Thus, a mold of a slide type can be made unnecessary in die cutting at the time of die cast, and a mold structure is never made complicated.

In addition, as shown in FIGS. 7 and 8, top wall parts and bottom wall parts exposed to the outside excluding the rear vertical walls and the front vertical walls of the left and the right cross member sections 2c and 3c form a V groove along an outer peripheral boundary line b of a fit and inserted part formed in a rectangular box shape in opposed ends 2n and 3n of the left and the right cross member sections 2c and 3c. Thus, weld-bonding intensity can be increased. In this case, since the fit and inserted part is opened to the outside, even if the thickness of tips is increased, a position of a parting line simply changes, and the mold structure is never made complicated.

The left and the right boss sections 2k and 3k are integrally formed on the opposed surfaces in the bottoms of the left and the right member sections 2c and 3c, and the support boss section 24, to which the link member 23 of the rear wheel suspension system 22 is coupled, is formed by bringing left and right boss sections 2k and 3k into abutment against each other and weld-bonding the left and right boss sections 2k and 3k. Thus, compared with the case in which a part to be a support boss section is welded to a bottom of the cross member section as in the past, manufacturing is easy and sufficient rigidity can be secured.

In addition, the left and the right arms sections 2a and 3a have the main arm sections constituting the bases of the triangles and the reinforcing arm sections B constituting the hypotenuses of the triangles, and the tuning plates 7 (reinforcing plates) are bonded in the parts at the rear of the cross member sections of the main arm sections A so as to close the openings of a C shape. Thus, rigidity of the entire rear arm can be further increased by a reinforcing action of the plates 7.

In addition, the tuning plates 7 also function as characteristic adjusting plates for finding operation stability or the like according to an application of the vehicle. In other words, although rigidity of the rear arm 15 affect operation stability of the vehicle, rigidity of the entire rear arm can be adjusted by appropriately changing locations and areas where the turning plates 7 are disposed, thickness of the turning plates 7, and the like, and it becomes possible to provide operation stability or the like according to an application of the vehicle.

Further, the dampers 25 consisting of an elastic member are intervened in a compressed state between the reinforcing ribs 5a to 5c of the left and the right arm sections 2a and 3a and the reinforcing plates 7. Thus, in particular, propagation of vibration due to chain driving or the like from the rear arm 15 to the body can be controlled, and the occurrence of noise can be controlled.

In this case, the dampers 25 are locked in the crossing parts of the plural reinforcing ribs 5a to 5c, and the dampers 25 are pressed by the tuning plates 7. Thus, the dampers 25 can be positioned surely, and the dampers 25 are prevented from moving due to vibrations or the like without providing a special positioning device.

In addition, in the case in which the left and the right arm molded bodies 2 and 3 are die-cast, the die-cast molds 26 having the plural molten metal inlets 26a, which are arranged along the main arm sections A of the left and the right arm sections 2a and 3a, and the molten metal outlets 26b, which are arranged in the reinforcing arm sections B so as to correspond to the molten metal inlets 26a, are used to supply molten metal in a direction traversing the triangles, that is, when the rear arm 15 is viewed as a whole, to supply molten metal along the sides of the rear arm 15. Thus, as shown in FIG. 4, the molten metal inlets 26a and the molten metal outlets 26b can be formed over substantially the entire length of the main arm sections A and the reinforcing arm sections B, and a total area of the molten metal inlets and outlets can be secured sufficiently. Therefore, it is possible to make the flow of the molten metal smooth, and the rear arm 15, which is relatively thin and has a complicated shape, can be cast surely. Incidentally, in the case in which, when the rear arm is viewed as a whole, molten metal is supplied in a direction perpendicular to the sides of the rear arm, more specifically, for example, in a direction of arrow C in FIG. 20, since the areas of the molten metal inlets and outlets cannot be increased, there is a limit in making the flow of the molten metal smooth.

Figure 20:
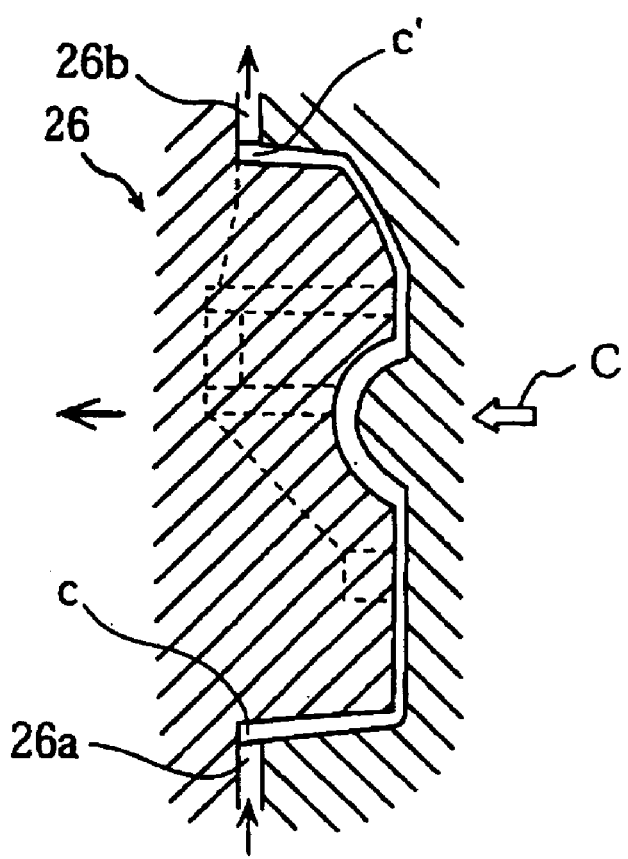
FIG. 20 is a schematic diagram for explaining a mold for manufacturing the rear arm.

In the case in which the molten metal is supplied in a direction traversing the triangles, as a cavity shape is shown in FIG. 20, where the edges c of the openings of the C shape in cross section are set thicker than the other parts, the molten metal inlets 26a are formed at the edges c of the openings of the main arm sections A, and the molten metal outlets 26b are formed at edges c' of the openings of the reinforcing arm sections B. Thus, sectional areas of parts corresponding to the molten metal inlets and outlets of the cavities are increased, and it is possible to make the flow of the molten metal smoother, and cutting and removing work of a pouring gate part formed after casting can be performed easily and surely.

According to an embodiment of the present invention, the rear arm is obtained by weld-bonding the left and the right arm molded bodies made of an aluminum alloy die-cast in both the pivot sections and the cross member sections. Thus, reduction in weight can be realized, and higher rigidity can be secured compared with the conventional rear arm in which only the cross member section is weld-bonded.

In particular, the left and the right arm sections are formed in substantially a triangular shape as viewed from the side, and the cross member sections are formed in a closed sectional shape extending from vertexes to bases of the triangular shapes. Therefore, since the arm sections of the triangular shape are further demarcated into two triangles by the cross member sections to form a truss structure, rigidity of the entire rear arm increases significantly.

Lengthwise spaces between the front vertical walls and the rear vertical walls constituting the closed sectional shape of the cross member sections are minimized in intermediate parts in the vertical direction and are widened toward upper or lower parts thereof. Thus, rigidity of the entire rear arm can be further increased. In other words, in the rear arm, although compression and tension loads act on the vertexes and the bases of the triangular shapes due to a road surface load, since the cross member sections have large lengthwise distances on an upper side and a lower side in the closed sectional shapes, the rear arm can cope with the large load appropriately.

One of the left and the right cross member sections is fit and inserted into the other of the left and the right cross member sections, and the fit and inserted part is welded. Thus, the bonding intensity can be increased compared with the case in which both the parts are simply brought into abutment against each other and welded.

The left and the right boss sections are integrally formed on the opposed surfaces of the bottoms of the left and the right cross member sections and are brought into abutment against each other and weld-bonded, whereby the support boss section, to which the link member of the rear wheel suspension system is coupled, is formed. Thus, compared with the case in which a part to be a support boss section is welded to bottoms of the cross member sections as in the past, manufacturing is easy and sufficient rigidity can be secured.

The left and the right arm sections have the main arm sections, which constitute the bases of the triangles, and the reinforcing arm sections, which constitute the hypotenuses of the triangles, and the reinforcing plates are bonded to the left and the right arm sections at least in parts at the rear of the cross member sections of the main arm sections so as to close the openings of a C shape in cross section. Thus, rigidity of the entire rear arm can be further increased by the reinforcing plates.

In addition, it is also possible to cause the reinforcing plates to function as characteristic adjusting plates for finding operation stability or the like according to an application of the vehicle. In other words, although rigidity of the rear arm affects operation stability of the vehicle, rigidity of the entire rear arm can be adjusted by appropriately changing locations and areas where the reinforcing plates are disposed, thickness of the reinforcing plates, and the like, and it becomes possible to provide operation stability or the like according to an application of the vehicle.

The dampers consisting of an elastic member are intervened in a compressed state between the reinforcing ribs of the left and the right arm sections and the reinforcing plates. Thus, in particular, propagation of vibrations due to chain driving or the like from the rear arm to the body can be controlled, and the occurrence of noise can be controlled.

In addition, the dampers are locked in the crossing section of the plural reinforcing ribs, which are formed on the sidewalls of a C shape so as to cross one another, and the dampers are pressed by the reinforcing plates. Thus, the dampers can be positioned surely, and it is possible to prevent the dampers from moving due to vibrations or the like without providing a special positioning device.

In the case in which the left and the right arm molded bodies are die-cast, the die-cast molds having the plural molten metal inlets, which are arranged along the bases or the hypotenuses of the triangles of the left and the right arm sections, and the molten metal outlets, which are arranged so as to correspond to the molten metal inlets, are used to supply molten metal in a direction traversing the triangles. Thus, a distance the molten metal flows can be minimized, the molten metal flows smoothly because the passage areas of the molten metal inlets and the molten metal outlets can be increased, and a rear arm, which is relatively thin and has a complicated shape, can be cast surely.

The edges of the openings of a C shape in cross section is set thicker than the other parts, the molten metal inlets are formed at the edges of the openings of the main arm sections constituting the bases, and the molten metal outlets are formed at edges of the openings of the reinforcing arm sections constituting the hypotenuses. Thus, sectional areas of parts corresponding to the molten metal inlets and outlets of the cavities formed of die-cast molds are increased, and it is possible to make the flow of the molten metal smooth, and the cutting and removing work of a pouring gate part formed by casting can be performed easily and surely.

According to the invention of claim 7, in the case in which the left and the right arm molded bodies are die-cast, the die-cast molds having the plural molten metal inlets, which are arranged along the bases or the hypotenuses of the triangles of the left and the right arm sections, and the molten metal outlets, which are arranged so as to correspond to the molten metal inlets, are used to supply molten metal in a direction traversing the triangles. Thus, a distance the molten metal flows can be minimized, the molten metal flows smoothly because passage areas of the molten metal inlets and the molten metal outlets can be increased, and a rear arm, which is relatively thin and has a complicated shape, can be cast surely.

According to the invention of claim 8, the edges of the openings of a C shape in cross section is set thicker than the other parts, the molten metal inlets are formed at the edges of the openings of the main arm sections constituting the bases, and the molten metal outlets are formed at edges of the openings of the reinforcing arm sections constituting the hypotenuses. Thus, sectional areas of parts corresponding to the molten metal inlets and outlets of cavities formed of die-cast molds are increased, and it is possible to make flow of the molten metal smooth, and cutting and removing work of a pouring gate part formed by casting can be performed easily and surely.

The invention claimed is:

1. A rear arm for a motorcycle, comprising:
left and right arm molded bodies made of aluminum alloy die-cast, which are formed by dividing pivot sections and cross member sections into left and right parts along a body central line, and obtained by weld-bonding the left and the right arm molded bodies in the pivot sections and the cross member sections; and
left and the right arm sections formed in substantially a triangular shape viewed from sides of the motorcycle and formed in substantially a C shape opening toward an inner side in a width direction of the viewed from sides of the motorcycle in cross section,
wherein the cross member sections are formed in a vertically long closed sectional shape and have rear vertical walls of an arc shape extending along a front edge of a rear wheel viewed from sides of the motorcycle.

2. The rear arm for a motorcycle according to claim 1, wherein the cross member sections have front vertical walls that are formed such that lengthwise spaces between the front vertical walls and the rear vertical walls are minimized in intermediate parts in a vertical direction and are widened toward upper or lower parts thereof.

3. The rear arm for a motorcycle according to claim 1, wherein one of the left and the right cross member sections is fit and inserted into the other of the left and the right cross member sections, and the fit and inserted part is welded.

4. The rear arm for a motorcycle according to claim 1, wherein a support boss section, to which a link member of a rear wheel suspension system is coupled, is integrally formed on bottom surfaces of the cross member sections, and the support boss section is constituted by bringing integrally formed left and right boss sections into abutment against opposed surfaces of the left and the right cross member sections and weld-bonding the left and the right boss sections to each other.

5. The rear arm for a motorcycle according to claim 1, wherein the left and the right arm sections have main arm sections, which constitute bases of triangles formed by providing openings at the rear of the cross member sections, and reinforcing arm sections, which constitute hypotenuses of the triangles, and reinforcing plates are bonded to the left and the right arm sections at least in parts at the rear of the cross member sections of the main arm sections so as to close openings of a C shape in cross section.

6. The rear arm for a motorcycle according to claim 5, wherein plural reinforcing ribs crossing one another are integrally formed on sidewalls of a C shape of the left and the right arm sections, dampers consisting of an elastic member are locked in crossing parts of the reinforcing ribs, so as to cover the reinforcing ribs, and the dampers are nipped in a compressed state by reinforcing plates and the reinforcing ribs.

7. The rear arm for a motorcycle according to claim 6, wherein the dampers include an elastic member disposed in compressed state between a tuning plate and the reinforcing ribs.

8. The rear arm for a motorcycle according to claim 1, wherein the left and the right arm molded bodies are cast by using die-cast molds having plural molten metal inlets, which are arranged along bases or hypotenuses of triangles of the left and the right arm sections, and molten metal outlets, which are arranged so as to correspond to the molten metal inlets, and supplying molten metal in a direction traversing the triangles.

9. The rear arm for a motorcycle according to claim 8, wherein edges of openings of a C shape in cross section is set thicker than other parts, the molten metal inlets are formed at edges of the openings of main arm sections constituting the bases, and the molten metal outlets are formed at edges of openings of the reinforcing arm sections constituting the hypotenuses.

10. The rear arm for a motorcycle according to claim 9, further comprising tuning plates arranged so as to close the openings on the inner side of the C shape.

11. The rear arm for a motorcycle according to claim 10, wherein the tuning plates are provided on front sides of the cross member sections.

12. The rear arm for a motorcycle according to claim 1, further comprising pivots sections of a closed sectional shape that bond front ends of the left and right arm sections to each other.

13. The rear arm for a motorcycle according to claim 12, wherein the cross member sections are of a closed sectional shape that bond sections between the pivot sections and rear wheel front edges of the left and the right arm sections to each other.

14. The rear arm for a motorcycle according to claim 13, wherein the pivot sections are pivotally supported by a body frame so as to swing freely in a vertical direction.

15. The rear arm for a motorcycle according to claim 14, further comprising a rear wheel being axially supported between rear ends of the left and the right arm sections.

16. The rear arm for a motorcycle according to claim 1, further comprising left and right bearing boss sections integrally formed at ends on an outer side of the left and right pivot sections.

17. The rear arm for a motorcycle according to claim 16, wherein the left and right bearing boss sections are supported by a pivot shaft.

* * * * *